United States Patent
Karlsson et al.

(10) Patent No.: US 9,642,049 B2
(45) Date of Patent: *May 2, 2017

(54) COMMUNICATION IMPROVEMENT AFTER HANDOVER

(71) Applicant: Telefonaktiebolaget L M Ericsson (publ), Stockholm (SE)

(72) Inventors: Robert Karlsson, Sundbyberg (SE); Erik Eriksson, Linköping (SE); Jonas Fröberg Olsson, Ljungsbro (SE); Kristina Jersenius, Linköping (SE); Tomas Jönsson, Luleå (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/018,215

(22) Filed: Feb. 8, 2016

(65) Prior Publication Data
US 2016/0157144 A1 Jun. 2, 2016

Related U.S. Application Data

(63) Continuation of application No. 14/237,921, filed as application No. PCT/SE2011/050989 on Aug. 15, 2011, now Pat. No. 9,374,741.

(51) Int. Cl.
*H04W 4/00* (2009.01)
*H04W 36/00* (2009.01)
(Continued)

(52) U.S. Cl.
CPC ... *H04W 36/0055* (2013.01); *H04W 36/0083* (2013.01); *H04W 36/30* (2013.01);
(Continued)

(58) Field of Classification Search
CPC ............. H04W 36/0055; H04W 52/38; H04W 36/0083; H04W 36/30; H04W 52/50; H04W 52/40; H04B 17/382
See application file for complete search history.

(56) References Cited

U.S. PATENT DOCUMENTS 5,109,390 A 4/1992 Gilhousen et al.
6,708,041 B1 3/2004 Butovitsch et al.
(Continued)

FOREIGN PATENT DOCUMENTS

EP 2175673 A1 4/2010
WO 2007149509 A2 12/2007
(Continued)

*Primary Examiner* — Phuc Tran
(74) *Attorney, Agent, or Firm* — Coats & Bennett, PLLC

(57) ABSTRACT

The invention relates to handover of a mobile station from a source cell to a target cell in a wireless communication network. According to the invention communication improving data in relation to communication between the source cell and the mobile station is collected by a communication improving node prior to handover and communication improving physical layer data being at least based on said collected communication improving data is transferred to a device handling communication between the target cell and the mobile station. The communication handling device then uses the communication improving physical layer data to improve the quality of the initial communication between the mobile station and the target cell after handover to the target cell.

5 Claims, 7 Drawing Sheets

(51) Int. Cl.
H04W 36/30 (2009.01)
H04W 52/38 (2009.01)
H04W 52/40 (2009.01)
H04B 17/382 (2015.01)
H04W 52/50 (2009.01)

(52) U.S. Cl.
CPC ........... H04W 52/38 (2013.01); H04B 17/382 (2015.01); H04W 52/40 (2013.01); H04W 52/50 (2013.01)

(56) References Cited

U.S. PATENT DOCUMENTS

| | | |
|---|---|---|
| 7,194,281 B2 | 3/2007 | Peng et al. |
| 7,693,093 B2 | 4/2010 | Riedel et al. |
| 8,050,222 B2 | 11/2011 | Maeda |
| 8,081,981 B2 | 12/2011 | Kim |
| 8,131,295 B2 | 3/2012 | Wang et al. |
| 8,144,589 B2 | 3/2012 | Meylan |
| 9,374,741 B2 * | 6/2016 | Karlsson ........... H04W 36/0055 |
| 2006/0079235 A1 | 4/2006 | Kim |
| 2009/0003282 A1 | 1/2009 | Meylan et al. |
| 2009/0022107 A1 | 1/2009 | Kapoor |
| 2009/0122730 A1 | 5/2009 | Yang et al. |
| 2009/0197606 A1 | 8/2009 | Bergman et al. |
| 2009/0201884 A1 | 8/2009 | Chaponniere |
| 2009/0216906 A1 | 8/2009 | Weniger et al. |
| 2011/0292911 A1 | 12/2011 | Uemura et al. |
| 2014/0226613 A1 * | 8/2014 | Kim ...................... H04L 1/1812 370/329 |
| 2014/0362801 A1 * | 12/2014 | Morita ............. H04W 72/0426 370/329 |
| 2015/0319643 A1 * | 11/2015 | Zhu ................... H04W 72/1215 370/336 |

FOREIGN PATENT DOCUMENTS

| | | |
|---|---|---|
| WO | 2008143564 A1 | 11/2008 |
| WO | 2010128902 A1 | 11/2010 |

* cited by examiner

COMMUNICATION IMPROVEMENT AFTER HANDOVER

This application is a continuation of U.S. patent application Ser. No. 14/237,921, filed 10 Feb. 2014, which is a national stage application of PCT/SE2011/050989, filed 15 Aug. 2011, the disclosures of each of which are incorporated herein by reference in their entirety.

TECHNICAL FIELD

The invention relates to handover in wireless communication networks. More particularly, the invention relates to a method and a node for improving communication after handover of a mobile station from a source cell to a target cell in a wireless communication network, to a method and device for handling communication between a target cell of a wireless communication network and a mobile station as well as to a method in a mobile station being handed over from a source cell to a target cell and such a mobile station.

BACKGROUND

A wireless communication network is typically made up of a number of cells, where each cell covers an area and communication in relation to a cell is provided by a base station. Mobile stations may thus communicate with the wireless communication network via these cells. As a mobile station involved in communication is moving in such a network, it is often handed over from one cell to another. Handovers may therefore be frequent.

Base stations and mobile stations can measure and collect information regarding the individual mobile station and the base station with which it is currently in contact.

The collected information can be used to improve the communication between a mobile station and the base station it is currently communicating with.

A lot of investigations have been made in relation to improving the decision of when handover is to be made.

One document directed towards handover is WO 2009/097906. This document describes the sending of radio resource information from a source base station to a target base station. The received radio resource information is then used by the target base station for generating handover feedback information, which is transferred to the source base station for assisting the source base station in the determination of a handover.

This means that the above mentioned collected information is known to be used for selecting which base station a mobile station shall communicate with in a handover determining situation.

It is also known to send Quality of Service Information like L2 layer information from a target base station to a source base station. This is for instance described in U.S. 2009/0201884.

Directly after a performed handover there may be delays and interruptions in the communication to and from the mobile station involved in the handover, this can lead to a temporary impairment in the quality of service for this mobile station.

Mobile stations that have performed handover can also disturb the communication to and from other mobile stations when the mobile station that has performed handover uses more resources than what is necessary.

It would therefore be of interest to improve on this situation when handing over a mobile station from one cell to another.

SUMMARY

The invention is therefore directed towards improving the initial communication between a mobile station and a target cell after handover has been performed.

One object of the invention is thus to enabling the improving of initial communication after such a handover.

This object is according to a first aspect of the invention achieved through a method for improving communication after handover of a mobile station from a source cell to a target cell in a wireless communication network. The method comprises:

collecting, prior to handover, communication improving data in relation to communication between the source cell and the mobile station, and transferring communication improving physical layer data to a device handling communication between the target cell and the mobile station. The communication improving physical layer data is at least based on the collected communication improving data and also provided for being used in improving the quality of the initial communication between the target cell and the mobile station after handover.

The object is according to a second aspect of the invention achieved through a node for improving communication after handover of a mobile station from a source cell to a target cell in a wireless communication network. The node comprises a communication interface (20) and a control unit. The control unit in turn comprises a data collecting element configured to collect, prior to handover, communication improving data in relation to communication between the source cell and the mobile station and a data transferring element configured to transfer communication improving physical layer data to a device for handling communication between the target cell and the mobile station. The communication improving physical layer data is at least based on the collected communication improving data and provided for being used in improving the quality of the initial communication between the target cell and the mobile station.

Another object of the invention is to improve the initial communication between a mobile station and a target cell after handover has been performed.

This object is according to a third aspect of the invention achieved through a method for handling communication between a target cell of a wireless communication network and a mobile station after handover of the mobile station from a source cell to the target cell. The method comprises:

receiving communication improving physical layer data from a node for improving communication after handover, and using the communication improving physical layer data to improve the quality of the initial communication between the mobile station and the target cell after handover to the target cell.

The communication improving physical layer data is at least based on communication improving data collected prior to a handover and in relation to communication between the source cell and the mobile station.

This object is according to a fourth aspect of the invention also achieved by a device for handling communication between a target cell of a wireless communication network and a mobile station after handover of the mobile station from a source cell to the target cell. The device comprises a communication interface and a control unit. The control unit in turn comprises a communication improving element configured to receive communication improving physical layer data from a node for improving communication after handover and use the communication improving physical layer data for improving the quality of the initial communication between the mobile station and the target cell after handover to the target cell. The communication improving physical layer data is at least based on communication improving data collected prior to a handover and in relation to communication between the source cell and the mobile station.

Another object of the present invention is to improve, in a mobile station, the initial communication between the mobile station and a target cell after handover has been performed.

This object is according to a fifth aspect of the invention achieved through a method in a mobile station being handed over from a source cell to a target cell in a wireless communication network. The method comprises:

receiving, after having been handed over from the source cell to the target cell, communication improving physical layer data comprising adaptation data from a node in the wireless communication network handling communication between the target cell and the mobile station, and using the adaptation data in the initial communication with the target cell for improving the quality of the communication.

The adaptation data is based on communication improving data collected by a node for improving communication after handover.

This object is according to a sixth aspect of the invention achieved through a mobile station for being handed over from a source cell to a target cell in a wireless communication network. The mobile station comprises a wireless communication interface, a radio communication unit and a control unit. The control unit in turn comprises a data receiving element configured to receive, after the mobile station has been handed over from the source cell to the target cell, communication improving physical layer data comprising adaptation data from a node in the wireless communication network handling communication between the target cell and the mobile station and a communication quality improving element configured to use the adaptation data in the initial communication with the target cell for improving the quality of the communication. The adaptation data is based on communication improving data collected by a node for improving communication after handover.

The invention has a number of advantages. Initial communication between a target cell and a mobile station is improved. Startup delay in the target cell may be decreased. The mobile station may also become faster to reach a steady state in its communication with the target cell and for instance faster to achieve desired/possible data rates. Disturbances, like interference, in the communication to and from other mobile stations in the system may furthermore be and the use of resources by the mobile station made more efficient, thereby raising the total system efficiency.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The present invention concerns handover in a wireless communication network, for instance a mobile communication network like a Long-Term Evolution (LTE), Universal Mobile Telecommunications System (UMTS) and Global System for Mobile Communications (GSM). These are just a few examples of networks where the invention can be implemented.

In the following description the network will be described in the form of a Long Term Evolution (LTE)/System Architecture Evolution (SAE) network as an example. This type of network may furthermore be divided into an access network and a core network. The other name for the LTE/SAE network is the Evolved Packet System (EPS) that comprises both the Evolved UTRAN (E-UTRAN) radio access network and the Evolved Packet Core (EPC) core network, where UTRAN is an acronym for UMTS Terrestrial Radio Access Network. More details about these networks may be found in 3GPP TS 23.401, which is herein incorporated by reference.

Figure 1:
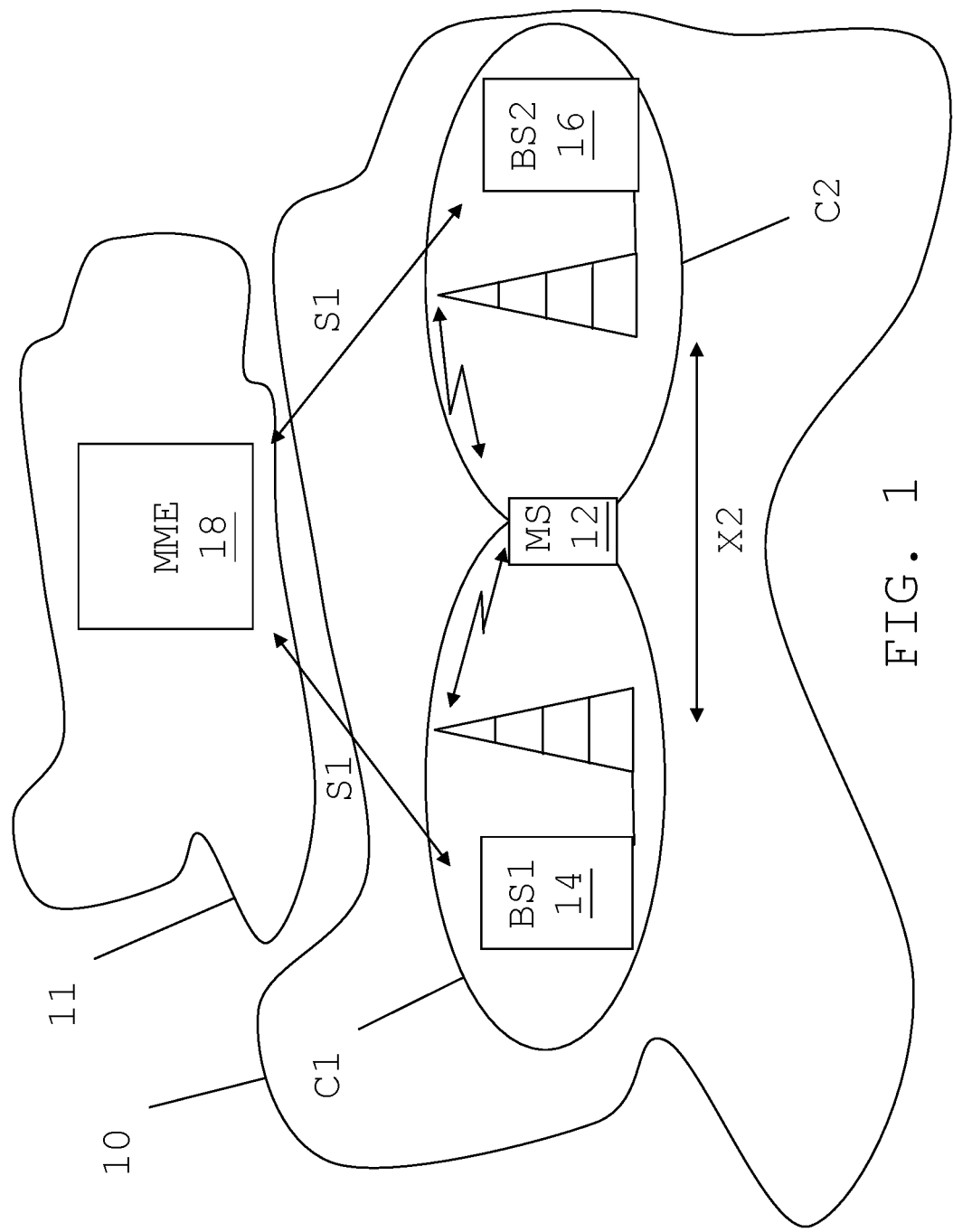
FIG. 1 schematically shows an access network comprising two base stations, each defining a cell, a mobile station as well as a mobility management entity in a core network.

In LTE a base station is normally termed evolved Node B (eNB). FIG. 1 shows an exemplifying access network 10 comprising two base stations, a first base station BS1 14 providing a first cell C1 and a second base station BS2 16 providing a second cell C2. The first base station 14 will in the following be acting as a serving or source base station for a mobile station 12. Because of this the first cell C1 will in the following be termed a source cell. The first base station will also in the following be termed a source base station. The mobile station 12 is here shown as communicating with both the first and the second base stations 14 and 16, which is the case when handover is being performed. In this respect the second base station 16 is a target base station providing a target cell, to which the mobile station 12 is being handed over from a source cell. Because of this the second cell C2 will in the following be termed a target cell and the second base station 16 will be termed a target base station.

It should here be realised that the access network 10 would normally comprise several more base stations, each forming one or more cells. However, only two are shown here in order to focus on the principles of the invention. Furthermore these base stations will in the following be described as providing one cell each, even though they may both provide more cells.

There is also a Mobility Management Entity MME 18, which is provided in a core network 11 of the wireless communication network. Generally an MME is responsible for signalling in respect of a mobile station.

The base stations can be communicating with each other using a so-called X2 interface, where communication between the source and the target base stations 14 and 16 is depicted using this interface. Base stations can also communicate with entities in the core network, such as the MME 18 using a so-called S1 interface. The first and the second base stations 14 and 16 are here also shown as being involved in such communication with the MME 22 in FIG. 1. These interfaces are defined in the standard 3GPP TS 36.300.

When communicating using the S1 interface, the MME may act as a relay node relaying data between the source and target base stations 14 and 16. It is also possible for the base stations to communicate with each other via the mobile station 12 when a handover is imminent. The mobile station 12 may thus also act as a relay node between two base stations.

Figure 2:
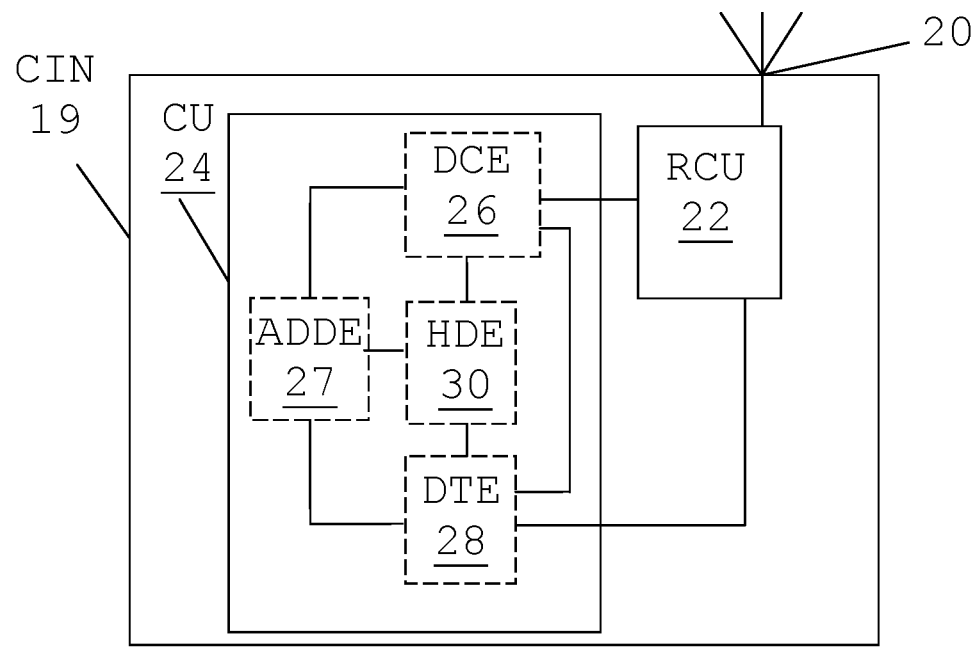
FIG. 2 shows a block schematic of one variation of a node for improving communication according to the invention.

FIG. 2 schematically shows a block schematic of a node 19 for improving communication after handover of a mobile station. This node is also termed a communication improving node CIN. This node can be implemented by a base station such as the source base station 14. However, it may also be implemented in other types of nodes, such as in an MME or a radio network controller (RNC). In a preferred embodiment of the invention this node is provided by the source base station 14. The exemplifying node 19 comprises a control unit CU 24 and a first communication interface. The communication improving node 19 shown in FIG. 2 is exemplified by a base station and therefore the first communication interface is a wireless communication interface, and here in the form of an antenna 20, which is connected to a radio communication unit RCU 22. The radio communication unit 22 is in turn connected to a data collecting element DCE 26 and to a data transferring element DTE 28. There is also a handover determining element HDE 30, which is connected to the data collecting element 26, to the data transferring element 28 and to an adaptation data determining element 27, where all these elements are provided in the communication improving node control unit 24. The data collecting element 26 is also connected to the data transferring element 28 as well as to the adaptation data determining element 27. This element 27 is optional and also connected to the data transferring element 28 and the handover determining element 30. It should furthermore be realised that also the handover determining element 30 can be omitted from the node, especially if another node handles handover.

Figure 3:
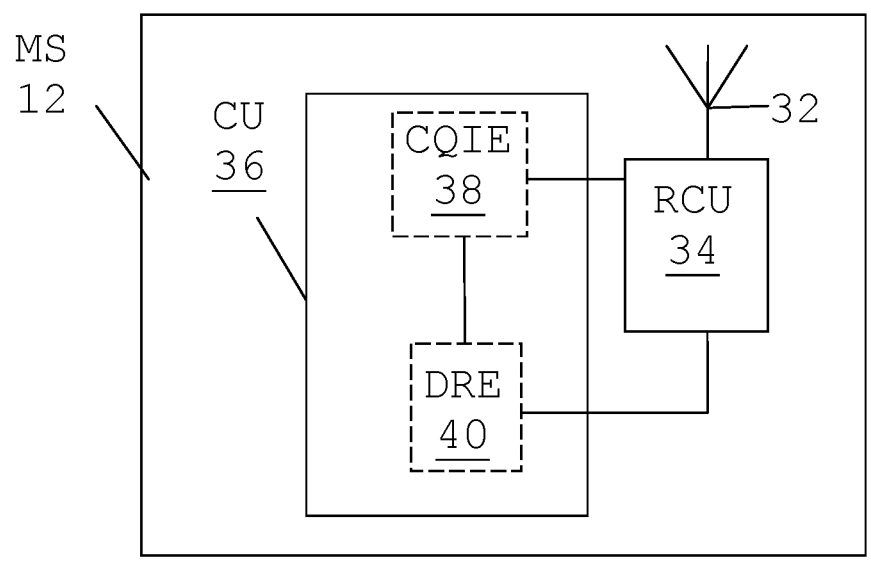
FIG. 3 shows a block schematic of one variation of a mobile station according to the invention.

FIG. 3 shows a block schematic of the mobile station 12. Also the mobile station 12 comprises a control unit CU 36, which is connected to a radio communication unit RCU 34. The radio communication unit 34 is in turn connected to an antenna 32. Here the radio communication unit 34 is more particularly connected to a data receiving element 40 and to a communication quality improving element 38 both provided in the mobile station control unit 36.

Figure 4:
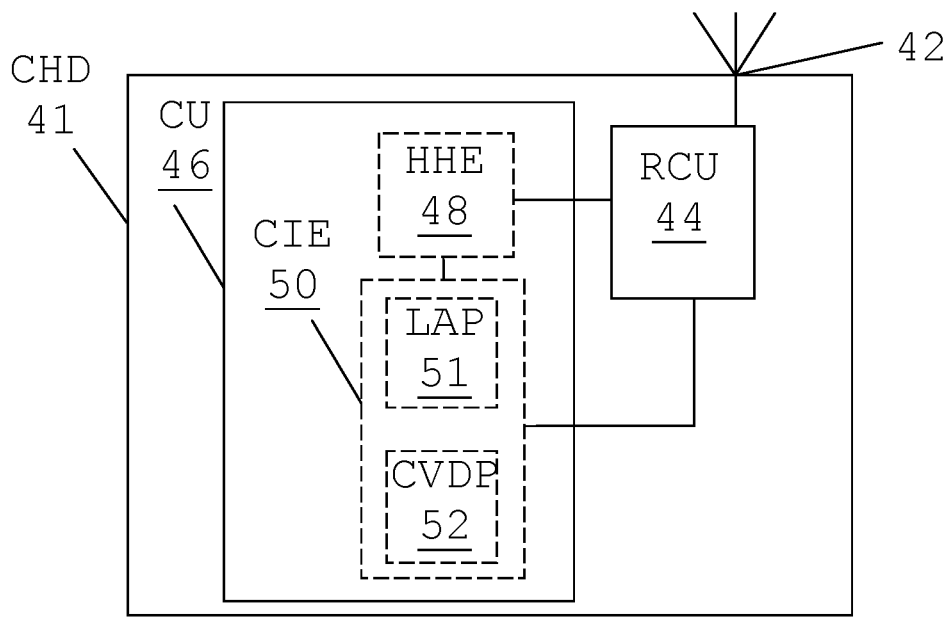
FIG. 4 shows a block schematic of one variation of a device for handling communication according to the invention.

A block schematic of a device 41 for handling communication between a target cell and the mobile station is shown in FIG. 4. The device is also termed a communication handling device CHD. In some embodiments of the invention this device is provided as a network node for handling communication of the target base station. Such a node is also termed a communication handling node. The device 41 exemplified in FIG. 4 is in the form of such a node. This node can be implemented by a base station. However, the network node may also be implemented in other types of nodes, such as in an MME or a radio network controller (RNC). In a preferred embodiment of the invention the device 41 is the network node provided by the target base station 16.

The communication handling device 41 here also comprises a control unit 46 and a communication interface 42. The communication handling device is exemplified by a base station and therefore the communication interface is a wireless communication interface, and here in the form of an antenna 42, which is connected to a radio communication unit RCU 44. The radio communication unit 44 is in turn connected to a handover handling element and to a communication improving element CIE 50, both provided in the communication handling device control unit 46 or communication handling node control unit. Here the communication improving element 50 comprises a link adjusting part LAP 51 and a control value determining part CVDP 52. The handover handling element 48 is finally also connected to the communication improving element 50.

In other variations of the invention the device may be provided in the form of a mobile station instead of as a network node. Therefore also the handover handling element 48 may be omitted from the device 41.

Mobile stations may move around in the access network 10 of the wireless communication network and may then also perform measurements, filter measured data and establish a picture of the current environment state (ES). These filtered measurements of communication improving data are communicated to the source base station in order to enable improved communication. With today's solutions, the environment state is not handed over to the target base station 16 from the source base station 14. Hence, when the mobile station 12 arrives in the target cell C2, measurements and establishing the determination of ES has to be restarted from scratch, not taking advantage of the prior knowledge from the source cell.

This means that there is a lot of information about the mobile station that is not forwarded to the target cell when the mobile station is handed over.

Examples of information that is typically lost are:
Prediction states such as outer-loop adjustment, Channel Quality Index (CQI), Rank Indicator (RI) and/or Precoding Matrix Indicator (PMI) predictions/histories, and interference prediction/history, sounding reference signal (SRS) quality prediction/history.

Algorithm states such as Physical uplink control channel (PUCCH) power control state, Physical Uplink Shared Channel (PUSCH) power control state, SRS power headroom report, and buffer status report.

Configuration parameters, both cell and terminal-specific, such as power control parameters In some scenarios the loss of this information can impact the performance experienced by the mobile station and/or the performance of the total system.

It is for instance possible that the link adaptation algorithm provided in a base station uses a large so-called back-off value, probably due to the fact that the mobile station over-estimates its decoding capability. However, the initial value for the back-off is normally small when the terminal has just performed handover, but is rapidly increased when the target cell discovers that the reported RI/CQI is over-estimated. If the back-off was forwarded to the target cell, this cell would directly be able to apply the back-off, which improves the performance for the mobile station.

Likewise the power used by the mobile station when controlled to meet a certain estimated link quality level such as a certain Signal to Interference-plus-Noise Ratio (SINR) can be a problem at handover. It is often the case that a high power level for the mobile station is initially used after handover. This means that the mobile station may use far too much power after the handover, which will cause interference in surrounding cells. If the steady-state of the power control could be forwarded to the target cell, the interference in surrounding cells would be decreases which in turn could increase the overall system performance.

According to the invention measurements and collected information, i.e. collected communication improving data, from a communication improving node associated with a source environment is forwarded to a device handling communication between a target cell and a mobile station for one mobile station that is being handed over from the source cell to the target cell. The collected communication improving data can also be considered to be communication environment data, i.e. data defining the environment, like the radio environment, in which communication between the source cell and the mobile station takes place.

Before or after a handover is executed, information that can be used to improve communication to and from a mobile station is thus forwarded from the source environment to the communication handling device.

The communication improving node and the communication handling device may be implemented through the source and target base stations, in which case the information transfer can either be a direct transfer between the two base stations or a transfer via another entity such as the mobile station making handover or via any other entity that can connect the two base stations, such as an MME.

Another part of the invention concerns forwarding of information about the target to the mobile station. According to this part of the invention the communication handling device is a communication handling node.

Before or after a handover is executed, physical layer data that can be used to improve communication to and from a mobile station is forwarded from the communication handling device to the mobile station.

This information transfer can either be directly from the communication handling device or via another entity such as the source cell.

Figure 5:
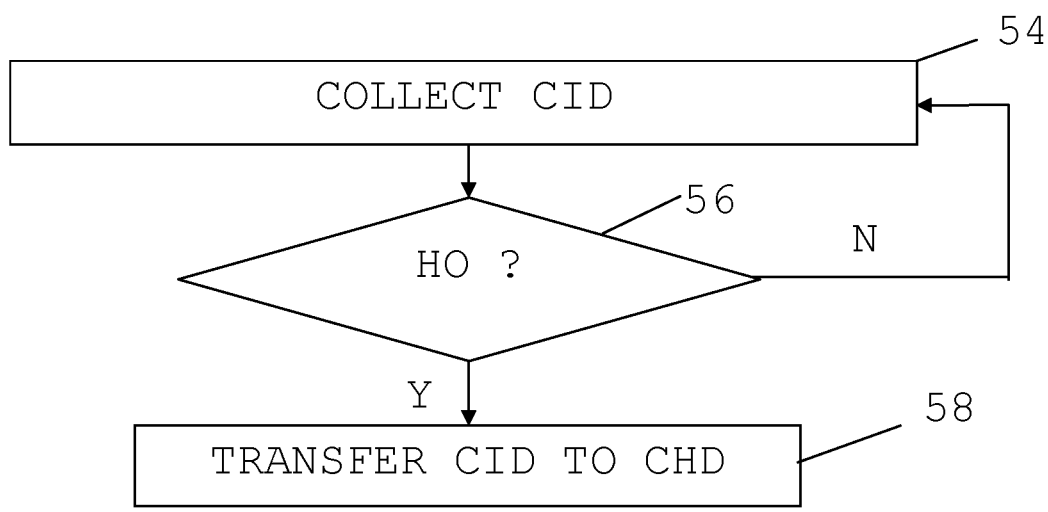
FIG. 5 shows a flow chart of a number of method steps being performed in a node for improving communication according to a first general embodiment of the invention.
Figure 6:
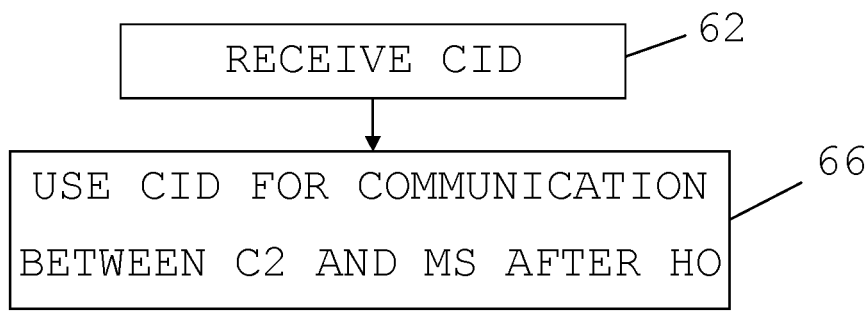
FIG. 6 shows a flow chart of a number of method steps being performed in a device for handling communication according to the first embodiment of the invention.

A first embodiment of the invention will now be described with reference being made to the previously described FIG. 1-4, as well as to FIG. 5, which shows a flow chart of a number of method steps being performed in the communication improving node 19 and to FIG. 6, which shows a flow chart of a number of method steps being performed in the communication handling device 41.

The mobile station 12 is initially in contact or communicating with the source cell C1 provided by the source base station 14. During this communication, the data collecting element 26 of the communication improving node 19 is collecting communication improving data CID in relation to or associated with the communication between the source cell and the mobile station via its communication interface, step 54. For this reason the communication improving node 19 is associated with the source cell C1 and in some variations of the invention also provided in the source base station 14 providing the source cell C1. If it is provided as the source base station 14, then collection of communication improving data is performed via the radio communication unit 22 and antenna 20. It should here be noted that communication between source cell and mobile station can be both uplink and downlink communication.

The communication improving data is data that is to be used for improving the quality of communication between the target cell C2 and the mobile station 12. It may for instance be or comprise physical layer data. It may also comprise quality enhancement assisting data such as acknowledgments of transmissions like positive and negative acknowledgments ACKs/NACKs, Gain-to-interference-and-noise ratio (GINR), Channel Quality Indicator (CQI) measurements, Rank indicator prediction, Precoding Matrix Indicator (PMI) prediction, Carrier-to-interference-and Noise Ratio (CINR) measurements, accumulated algorithm states such as power control parameters, power headroom and buffer status reports.

Such data may be obtained form a node handling communication for the source cell C1, like for instance from the source base station or a radio network controller (RNC) handling a source base station, while other data may be collected from the mobile station.

This means that also other data such as signal strength measurements relating to other cells may be collected.

The collected data may thus be data used for enhancing the quality of the communication between the source cell C1 ands the mobile station 12 when the mobile station 12 is communicating with the source cell C1.

Such data may be continuously collected and used in improving the quality of the communications between the source cell C1 and mobile station 12. It is here possible that collected data is processed in the optional adaptation data determining element 27, for instance in order to obtain adjustment data for use in control loops for controlling communication between the target cell C2 and the mobile station 12. It is also possible that collected data is not processed.

Some or all of the collected data may also be provided to a handover determining element 30 for allowing this element to decide if a handover is to be made or not. This element 30 may be provided in the communication improving node 19, as shown in FIG. 2, or it may be provided in a different node. When the element decides if a handover is to be made, step 56, this handover may also be based on other data such as bit error rate.

The collection of data, step 54, which is done prior to handover, is then continued as long as the mobile station 12 is communicating with the source cell C1, i.e. as long as there is no handover, step 56. However, in case it is decided that the mobile station 12 is to be handed over to the target cell C2, step 56, then communication improving physical layer data is forwarded to the data transferring element 28, which then transfers the communication improving physical layer data to the communication handling device 41 via the communication interface, step 58, which may in some embodiments of the invention be via the radio communication unit 44 and antenna 42. The communication improving physical layer data is at least based on the collected communication improving data. This means that the transferred data may be the collected communication improving data or it may be collected data that has been processed.

Communication improving physical layer data is here communication improving data concerning the physical layer in the OSI model. As understood from what is mentioned above it is here possible that collected communication improving data is such communication improving physical layer data to be transferred, in which case it is forwarded from the data collecting element 26 to the data transferring element 28. It is also possible that that communication improving physical layer data is the result of processing of collected communication improving data, for instance in the adaptation data determining element 27, in which case such processed data is forwarded from this element 27 to the data transferring element 28. Thereafter handover is performed in normal fashion by the handover determining element 30.

The communication improving physical layer data is received by the communication improving element 50 of the communication handling device 41 via the communication interface of the device 41, step 62. For this reason the communication improving device may be associated with the target cell C2 and in some variations of the invention also provided in the base station providing the target cell C2, i.e. the target base station 16. In the example of FIG. 4 the device is provided as the target base station 16 and therefore the communication improving element receives the data via the antenna 42 and the radio communication unit 44.

In some cases the device may also assist in the handover and for this reason the communication handling device 41 may comprise a handover handling element 48, such as exemplified in FIG. 4. The handover handling element 48 may then assist in the handover of the mobile station through communicating with the handover determining element 30 of the source base station 14 via the radio communication unit 44 and antenna 42. As soon as the communication improving element 50 receives notification that the mobile station 12 has been handed over to the target cell C2, which notification may be performed by the handover handling element 48, the communication improving element 50 uses the communication improving physical layer data for improving the initial communication between the target cell C2 and the mobile station. The communication being improved may also here be both uplink and downlink communication. This furthermore means that the received communication improving data, which relates to the communication between the source cell C1 and the mobile station 12 for instance through being collected when this communication between source base station 14 and mobile station 12 takes place, is used by the communication improving element 50 of the communication handling node 41 for improving the quality of the initial communication between the target cell C2 and mobile station 12 after handover. It can thus be seen that data defining the radio environment of the communication between source cell and mobile station is used for improving initial communication between target cell and mobile station. This may involve the direct use of the received communication improving physical layer data for influencing the communication, like for instance improving communication channel quality. It may also involve processing the received communication improving data for obtaining data that can be used for improving the initial communication. The use may for instance be the use for providing initial set points in communication enhancing control loops. Such loops may be provided in either the base stations or the mobile station. Therefore the communication handling device may be a network node such as the target base station 16. However it may also be the mobile station 12. If the communication handling device is provided as a network node, the use may also involve determining data that can be used by the mobile station for improving communication, for instance for providing the mobile station with initial communication values.

In this way it is possible to considerably lower the time needed for obtaining communication of a good quality been the target base station and the mobile station after handover. This may also lower the energy consumed by the mobile station and the interference caused by the mobile station and thereby improve overall system performance.

Figure 9:
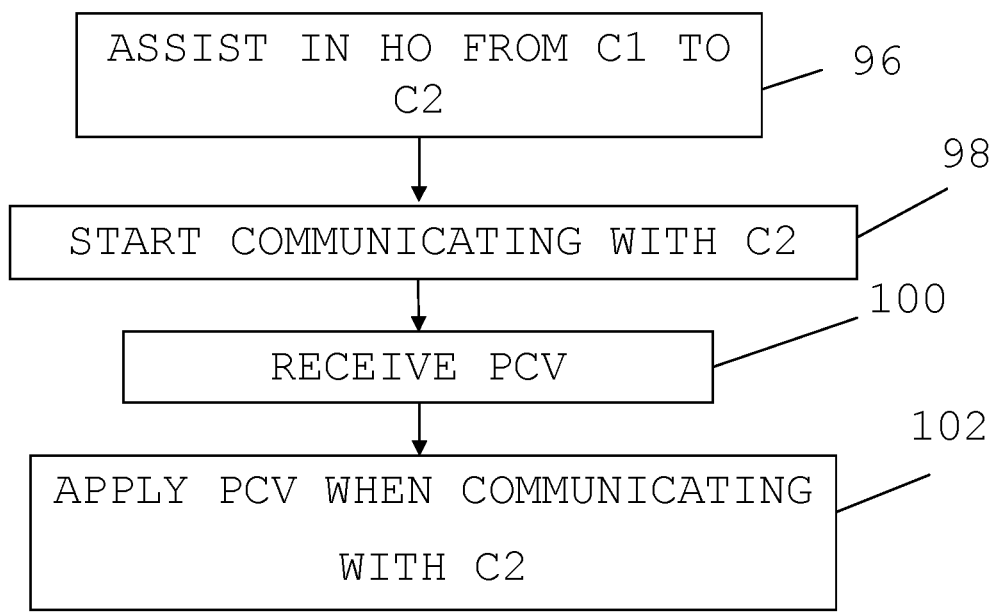
FIG. 9 shows a flow chart of a number of method steps being performed in the mobile station according to the second embodiment of the invention, FIG. 10 schematically shows signals exchanged between the mobile station the node for improving communication node and the device for handling communication as well as further activities in these entities when improving communication after handover according to a first scheme of the invention, and FIG. 11 schematically shows signals exchanged between the mobile station, the node for improving communication node and the device for handling communication as well as further activities in these entities when improving handover according to a second scheme of the invention.
Figure 7:
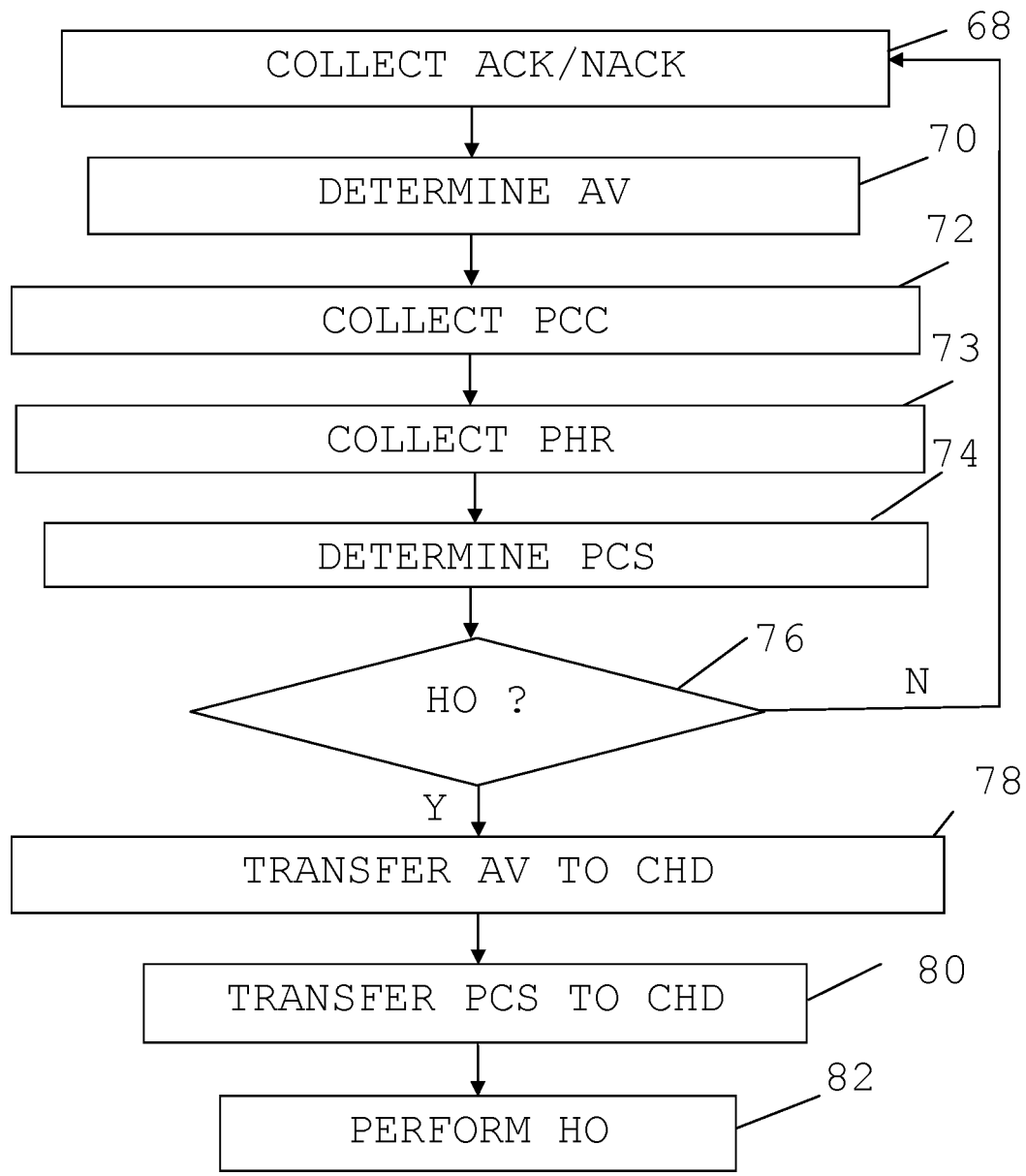
FIG. 7 shows a flow chart of a number of method steps being performed in the node for improving communication according to a second embodiment of the invention.
Figure 8:
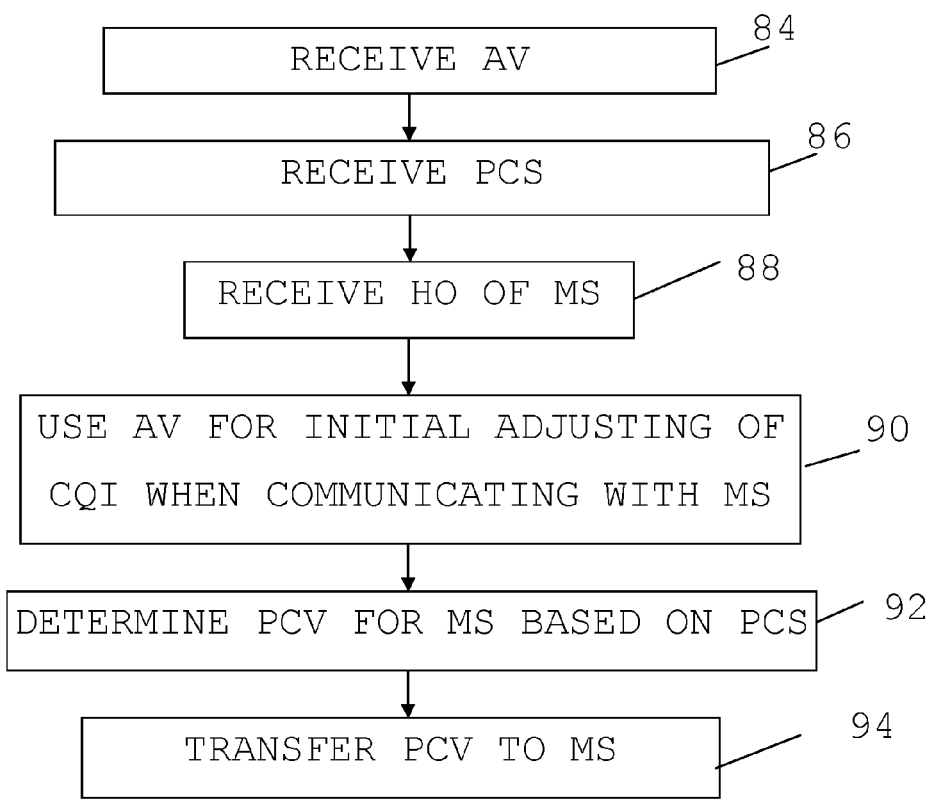
FIG. 8 shows a flow chart of a number of method steps being performed in the device for handling communication according to the second embodiment of the invention.
Figure 10:
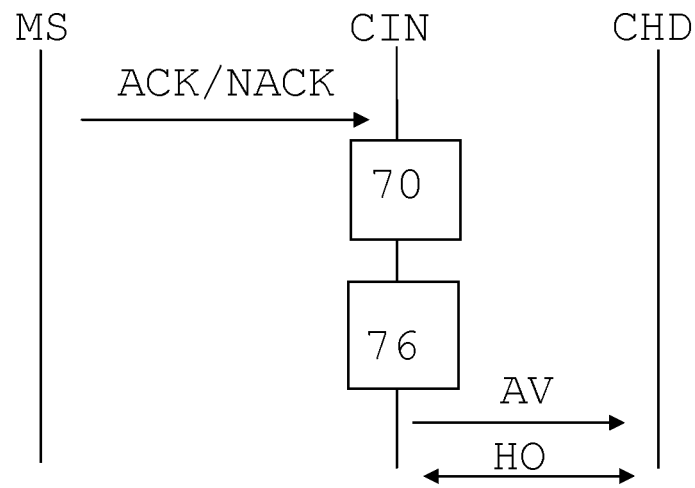
Figure 11:
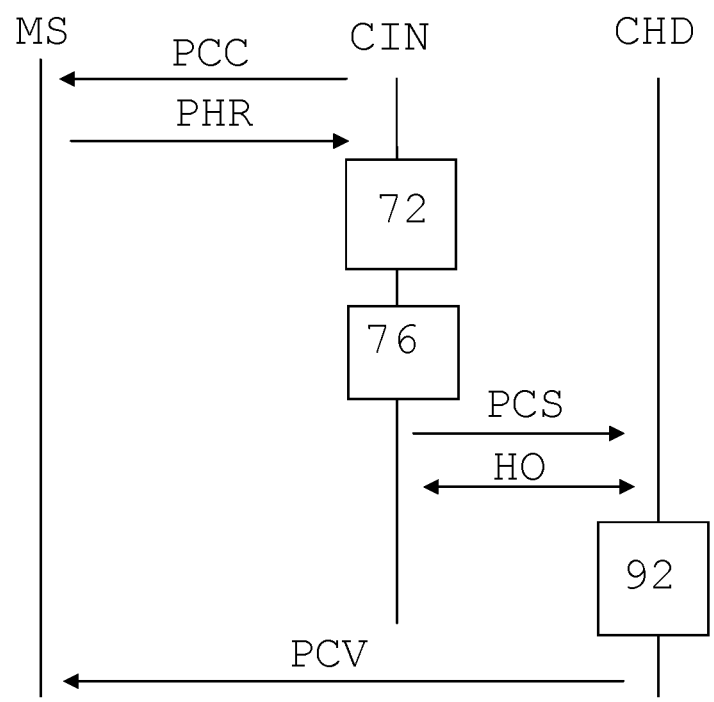

A second preferred embodiment of the present invention will now be described with reference being made to the previously described FIGS. 1, 2, 3 and 4 as well as to FIGS. 7, 8, 9, 10 and 11. Here FIG. 7 shows a flow chart of a number of method steps performed for the source cell C1, FIG. 8 shows a flow chart of a number of method steps being performed for the target cell C2, FIG. 9 shows a flow chart of a number of method steps being performed in the mobile station 12, FIG. 10 schematically shows signals exchanged between the mobile station, the communication improving node and communication handling device as well as further activities in these entities when improving handover according to a first scheme, and FIG. 11 schematically shows signals exchanged between the mobile station, the communication improving node and communication handling device as well as further activities performed in these entities when improving handover according to a second scheme.

In the second embodiment the communication improving node 19 is implemented in the target base station 14 and the communication handling device is a network node, a communication handling node. In this second embodiment the network node is furthermore the target base station 14.

In this second embodiment the first and second schemes of improving handover are both applied. It should however be realized that this is no requirement. In some embodiments of the invention only the first scheme is used, while in others only the second scheme is used.

In this second embodiment the data collecting element 26 of the communication improving node 19 again collects communication improving data related to the communication between the source cell C1 and the target cell C2 via the radio communication unit 22 and antenna 20. One type of data that is being collected is quality enhancement assisting data, i.e. data collected for use in assisting in enhancing communication quality between mobile station 12 and target cell C2. This data comprises acknowledgments ACK/NACK, positive and negative, sent from the mobile station 12 to the source cell C1, said acknowledgments being acknowledgements of transmissions on a link between the source cell C1 and the mobile station 12. The data collecting element 26 thus collects acknowledgements ACK/NACK from the mobile station 12, step 68. These acknowledgments ACK/NACK are then forwarded from the data collecting element 26 to the adaptation data determining element 27, which goes on and determines adaptation data for adjusting link quality between the target cell C1 and the mobile station 12 based on the collected communication improving data. The adjustment data is in this second embodiment further more link adaptation data for adjusting a transport format used between the target cell C2 and the mobile station 12. Here the adjustment data comprises an adjustment value AV for adjusting a channel quality indicator provided by the mobile station, step 70.

In this second embodiment the mobile station 12 furthermore measures and reports a channel quality indicator (CQI) to the source base station 14. In the source base station 14, the CQI reports are used in the link adaptation of the data transmission. However, the CQI reports may be inaccurate due to for example measurement errors and delays between the time the CQI is measured and the data transmission is received by the mobile station 12. One way to handle CQI inaccuracies is to apply an outer loop link adaptation in order to reach a certain Hybrid Automatic Repeat reQuest (HARQ) operating point, e.g. a block error rate of 10%. This means that the reported CQI is adjusted in the source base station 14 based on the HARQ ACK/NACKs received from the mobile station 12. The adjustment can be done by applying a back off value to the CQI estimate obtained from the CQI report. The back off value is updated based on the received HARQ ACK/NACKs. In this second embodiment of the invention the adjustment value AV is such a backoff value, which is used according to the first scheme.

Another type of communication improving data being collected are power control commands PCC sent from source cell C1 to the mobile station 12. The data collecting element 26 of the node 19 thus collects power control commands PCC, step 72, and forwards them to the adjustment data determining element 27. In this second embodiment the data collecting element 26 also collects power headroom reports PHR sent from the mobile station 12 to the source cell C1, step 73, and forwards these to the adjustment data determining element 27. According to the second scheme, the adjustment data determining element 27 goes on and determines a power control state PCS based on the power control commands PCC, step 74.

This may be done in the following way.

In LTE, the power allocated for Physical Uplink Shared Channel (PUSCH), Physical uplink control channel (PUCCH) and sounding reference signals (SRS) are controlled by three different control loops. For PUSCH the power control algorithm can be configured to the following simple form:

$$P(i)=\min\{P_{max}, M_{dB}+P_0+\alpha \cdot PL+f(i)\} \quad (1)$$

where $P_{max}$ is the maximum power configured for the mobile station, $M_{dB}$ is the number of resource blocks assigned for the mobile station expressed in dB, $P_0$ is a configuration parameter comprising a cell-specific and a mobile station-specific term, $\alpha$ is a mobile station-specific parameter between 0 and 1, PL is the path-loss estimated by the mobile station, and f(i) is a closed-loop term value determined based on the accumulated value of the power control commands PCC sent by the source cell to the mobile station with the restriction that f(i) is not increased or decreased if the mobile station has reached its maximum or minimum configured power. This closed-loop term value f(i) is a power control state.

The LTE standard says that f(i) shall be reset to zero when the mobile station connects to a new base station. Here f(i) is also termed a power control state PCS.

It is possible that that the adjustment data determining element 27 does not know the exact value for f(i) from the accumulated transmitted power control commands PCC, since f(i) is not increased if the terminal is power limited. However, it is possible to estimate f(i) from the Power Headroom Report (PHR), the power control state f(i) can thus be approximated. The determined power control state PCS is then either the known value of f(i) or an estimation $\hat{f}$ of this know value f(i). This estimation can also be an average of known values.

Thereafter the handover determining element 30 determines whether the mobile station 12 is to be handed over from the source cell C1 to the target cell C2, step 76, which determination may use data collected by the data collecting element 26 and data from the adjustment data determining element 27. Handover is here determined and performed in a known fashion with the aid of the mobile station 12 and the target base station 16.

If there is to be no handover, step 76, then steps 68-74 are repeated.

However, if there is to be a handover, step 76, then the data transferring element 28 is informed of this fact. The data transferring element 28 then collects the data determined by the adjustment data determining element 26, which data in this example comprises the determined power control state PCS and adjustment value AV as well as possible other collected data from the data collecting element 26.

The data transferring element 28 thus transfers the adjustment value AV to the communication handling device 41, step 78, and also transfers the power control state PCS to the communication handling device 41, step 80. Thereafter handover is performed, step 82, which may be done by the handover determining element 30.

The adjustment value AV is then received by the communication improving element 50 of the communication handling device 41, step 84. Furthermore, the power control value PCV is also received by the communication improving element 50, step 86. As the device in this second embodiment is the a network node in the form of the target base station 16, the communication improving element receives the data via the radio communication unit 44 and antenna 42.

Here the link adjustment part 51 receives the adjustment value AV for processing according to the first scheme, while the control value determining part receives the determined power control state PCS for processing according to the second scheme.

Thereafter the target cell C2 receives the mobile station in a handover HO, step 88, in which handover the handover handling element 48 may assist in a known manner.

After the handover has been performed, the link adjustment part 51 then uses the adjustment value AV, in the first scheme as implemented in the second embodiment, for adjusting a transport format used between the target cell C2 and the mobile station 12, step 90. In the present embodiment this means that the link adjustment part 51 uses the received adjustment value AV as an initial back off value for adjusting CQI reports made by the mobile station 12 to the target cell C2.

Similarly, the control value determining part 52 uses, in the second scheme as implemented in the second embodiment, the received power control state PCS after the performing of handover HO.

Here the control value determining part 52 determines a power control value PCV for the mobile station based on the received power control state PCS.

In the example of the power control state PCS being an estimated value $\hat{f}$ of a known value f(i), the source base station 14 forwards the estimated value $\hat{f}$ of f(i) when handover HO is being made. If both source and target cells C1 and C2 use the same configuration principle, then the estimated value $\hat{f}$ of f(i) can be used by the target to adjust the nominal power $P_0$ as $$P_{new,0} = P_{target,0} - \hat{f},  \quad (2)$$

where $P_{target,0}$ would be the desired power $P_0$ if things would work as expected.

A power control value PCV representing the mobile station power level $P_{new,0}$ is thus determined and thereafter transferred from the control value determining part 52 of the communication improving element 50 to the mobile station 12 via the radio communication unit 44 and antenna 42, step 94.

In relation to the handover, the mobile station 12 assists in the handover HO from source cell C1 to target cell C2, step 96, for instance through providing measurements of link quality regarding both the source and target. After the handover HO the mobile station 12 then starts to communicate with the target cell C2 instead of with the source cell C1, step 98, which may be performed by the radio communication unit 34 using antenna 32 in a known fashion.

As the communication has been initiated with the target cell C2 through communicating with the communication handling device 41, adaptation data is received from the communication handling node 41 by the data receiving element 40 via the radio communication unit 34 and antenna 32, step 100. As understood from the foregoing description the adaptation is based on communication improving data collected by the communication improving node 19. In this second embodiment the adaptation data is furthermore the above mentioned power control value PCV. The adaptation data is then provided from the data receiving element 40 to the communication quality improving element 38, which in turn uses the adaptation data in the initial communication with the target cell C2. In this second scheme as implemented in the second embodiment of the invention the adaptation data is used as an initial value of a link quality adjusting function. More particularly the power control value PCV is applied in a power adjusting function that adjusts the output power of the mobile station, step 102.

In this way initial communication between a target cell and a mobile station is improved considerably. Startup delay in the target cell is also decreased, by handing over parameters and states, in the form of communication improving physical layer data setting out the radio environment of the communication between source cell and mobile station, from the source cell to the target cell. The mobile station will thereby be faster to reach a steady state in for example link adaptation, power control, and channel estimation; and thus faster to achieve desired/possible data rates. Disturbances, like interference, in the communication to and from other mobile stations in the system are furthermore decreased when mobile stations performing incoming handovers do not use excess resources. The use of resources is thus more efficient.

In the above described second embodiment, the communication improving node and the communication handling device were both base stations. It should here be realized that as an alternative they may be provided as other entities, such as a radio network controller, (RNC) controlling one or more base stations or some other network entities dedicated to the functions described in relation to the communication improving node and communication handling device. The communication handling device may also be provided as a mobile station.

There are many variations that can be made to the invention apart from those already mentioned. The example of adaptation value give above was a downlink adaptation value. It is also possible to determine an uplink adaption value in a similar manner based on downlink acknowledgements to be used by the mobile station, which adaptation may be transferred from the communication improving node to a network node such as the target base station for provision to the mobile station after handover or for provision directly to the mobile station from the communication improving node for use after handover. Also the power control command can be determined by the communication improving node and directly transferred to the mobile station, which then acts as a communication handling device. This power control command may be accompanied by a instruction to use the command after handover. It is also possible that the mobile station knows that the transferred handover command should be used after handover.

In the embodiments described above communication improving physical layer data was transferred from the communication improving node to the communication handling device before handover was being made. IT should be realized that such data may also be transferred after handover.

The functionality of the communication handling node and the communication improving node may be provided in the same node, for instance in order to handle both source and target activities in relation to a cell. Here it should also be realized that a base station may be provided with more than one cell. Therefore the improving of communication after handover described above may be performed in relation to handover between two cells provided by the same base station.

Furthermore when communication improving physical layer data is forwarded from the communication improving node to the communication handling device via a mobile station, the mobile station may be configured to store this data for being applied after handover.

The various control units described earlier may each be provided in the form of a processor with associated program memory including computer program code for performing the functionality of the corresponding elements. It should be realized that the control units may also be provided in the form of hardware, like for instance in the form of ASICs circuit.

The radio communication units may typically be made up of conventional baseband coding element, and modulating elements and amplifying elements.

In the examples given above the base stations were described as comprising only one antenna. It should however be realised that they may comprise more antennas.

The quality enhancement assisting data was above described as comprising collected acknowledgements of transmissions. It should be realized that as an alternative the collected quality enhancement assisting data may comprise statistics of such acknowledgements. Similarly statistics of power control commands may be collected instead of or in addition to power control commands as such.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims. This invention has for instance been exemplified with E-UTRAN and EPC (i.e. LTE/SAE). However it should be realized that the invention can be used in other mobile networks.

What is claimed is:

1. A method in a mobile station being handed over from a source cell to a target cell in a wireless communication network, the method comprising:
   receiving, after having been handed over from the source cell to the target cell and from a first node in the wireless communication network handling communication between the target cell and the mobile station, communication improving physical layer data comprising adaptation data for adjusting link quality between the target cell and the mobile station, the adaptation data being based on communication improving data collected by a second node for improving communication after handover; and
   using the adaptation data in initial communication with the target cell for improving quality of the initial communication;
   wherein the collected communication improving data comprises quality enhancement assisting data;
   wherein the adaptation data is determined based on the quality enhancement assisting data.

2. The method of claim 1:
   wherein the collected communication improving data comprises power control commands sent from the source cell to the mobile station;
   wherein the adaptation data comprises a power control value having been obtained based on the power control commands;
   wherein the using the adaptation data comprises using the power control value in a power adjusting function.

3. A mobile station for being handed over from a source cell to a target cell in a wireless communication network; the mobile station comprising:
   an antenna;
   a radio communication circuit;
   a data receiving circuit operatively connected to the radio communication circuit and configured to receive, after the mobile station has been handed over from the source cell to the target cell, communication improving physical layer data comprising adaptation data for adjusting link quality between the target cell and the mobile station, the adaptation data received from a first node in the wireless communication network handling communication between the target cell and the mobile station, the adaptation data based on communication improving data collected by a second node for improving communication after handover; and
   a communication quality improving circuit configured to use the adaptation data in initial communication with the target cell for improving quality of the initial communication;
   wherein the collected communication improving data comprises quality enhancement assisting data;
   wherein the adaptation data is determined based on the quality enhancement assisting data.

4. The mobile station of claim 3, wherein the communication quality improving circuit is configured to:
   provide a link quality adjusting function; and
   use the adaptation data as an initial value of the link quality adjusting function.

5. The mobile station of claim 3:
   wherein the communication improving data comprises power control commands sent from the source cell to the mobile station;
   wherein the adaptation data comprises a power control value obtained based on the power control commands;
   wherein the communication quality improving circuit is configured to use the power control value in a power adjusting function.

* * * * *